United States Patent
Wöhrstein et al.

(10) Patent No.: US 10,151,603 B2
(45) Date of Patent: Dec. 11, 2018

(54) EXPLOSION-PROOF HOUSING FOR A SENSOR

(71) Applicant: Hengstler GmbH, Aldingen (DE)

(72) Inventors: Andreas Wöhrstein, Neuhausen (DE); Peter Elbel, Schramberg (DE)

(73) Assignee: HENGSTLER GMBH, Aldingen (DE)

( * ) Notice: Subject to any disclaimer, the term of this patent is extended or adjusted under 35 U.S.C. 154(b) by 311 days.

(21) Appl. No.: 14/928,321

(22) Filed: Oct. 30, 2015

(65) Prior Publication Data
US 2016/0128213 A1    May 5, 2016

(30) Foreign Application Priority Data

Oct. 30, 2014  (DE) .................. 10 2014 016 052

(51) Int. Cl.
| | |
|---|---|
| *G01D 5/12* | (2006.01) |
| *G01D 11/24* | (2006.01) |
| *H02K 5/136* | (2006.01) |
| *F16B 33/00* | (2006.01) |

(52) U.S. Cl.
CPC ............. *G01D 5/12* (2013.01); *G01D 11/245* (2013.01); *H02K 5/136* (2013.01); *F16B 33/004* (2013.01)

(58) Field of Classification Search
CPC ................................. G01D 11/24; G01D 5/12
USPC ........................................................ 73/431
See application file for complete search history.

(56) References Cited

U.S. PATENT DOCUMENTS

| | | | | |
|---|---|---|---|---|
| 6,392,322 | B1* | 5/2002 | Mares ...................... | B23Q 5/58 310/12.04 |
| 7,392,597 | B2* | 7/2008 | Steinich ................... | G01B 3/11 33/1 PT |
| 9,355,800 | B2* | 5/2016 | Henderson ........... | H01H 36/004 |
| 9,728,358 | B2* | 8/2017 | Henderson ......... | H01H 36/0073 |

FOREIGN PATENT DOCUMENTS

| | | |
|---|---|---|
| DE | 102005005111 A1 | 10/2005 |
| DE | 102005037862 B3 | 1/2007 |
| DE | 102009019172 A1 | 11/2010 |
| DE | 102010050608 A1 | 5/2012 |
| JP | 05137289 A * | 6/1993 |
| JP | 2007155639 A * | 6/2007 |
| WO | 02046702 A1 | 6/2002 |

* cited by examiner

*Primary Examiner* — Lisa Caputo
*Assistant Examiner* — Jamel Williams
(74) *Attorney, Agent, or Firm* — Browdy and Neimark, P.L.L.C.

(57) ABSTRACT

The explosion-proof housing for a sensor, in particular, for a rotary encoder having a shaft rotatably situated in the rotary encoder and axially aligned to detect a rotary angle, having a flameproof interior vis-a-vis the atmosphere, in which at least one sensor part is situated, and an at least two-part, approximately cylindrical overall housing is made up of a cover having a cable inlet, which is releasably coupled to a possibly multi-part housing by a plurality of fastening screws distributed around the circumference, and the contacting fastening planes of the cover and housing are designed as explosion-proof ex-joints, and at least the fastening screws between the cover and the possibly multi-piece housing create the separation between the flameproof interior and the atmosphere by forming ex-joints.

18 Claims, 3 Drawing Sheets

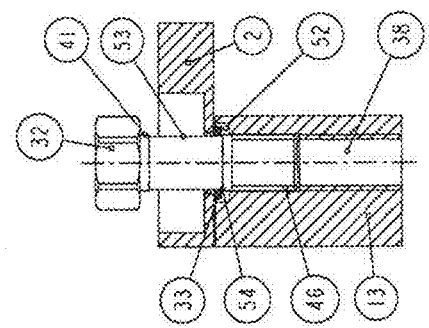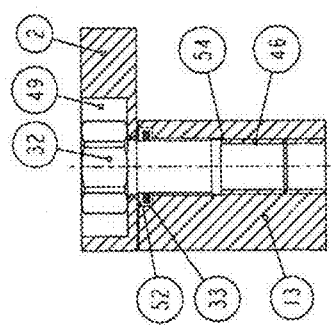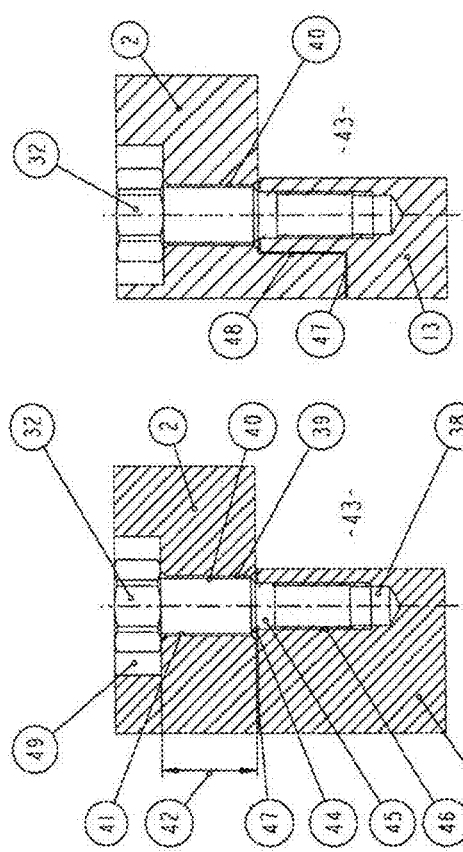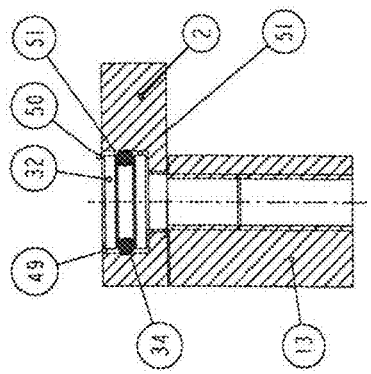

EXPLOSION-PROOF HOUSING FOR A SENSOR

FIELD

The present invention relates to an explosion-proof housing for a sensor, in particular, a rotary encoder.

BACKGROUND

For this type of explosion-proof housing, it is permitted that an explosion can occur in the interior of the housing and the resulting explosion pressure in this instance, having a pressure of, for example, 40 bar, must not expand outwards into the atmosphere. For this purpose, such housings are flame-proof. For housings composed of a plurality of parts, the ignition spark resulting in the interior is not to expand out into the environment. For this purpose, the joining gaps between the interlocking housing parts are designed having fit dimensions with narrow tolerances. The joining gaps according to DIN EN 60079-1 (VDE 0170-5) must have such a length and (small) width so that an explosion pressure resulting in the interior of the housing extinguishes in the joining gap (subsequently also referred to as ex-joint) and cannot expand into the atmosphere.

Hence, it is ensured that a flash-over of the explosion occurring in the proofed interior does not carry-over into the atmosphere—which, if applicable, is enriched with a flammable mixture—surrounding the sensor.

The company Pepperl+Fuchs has introduced cylindrical rotary encoder housings as part of their 78-E series which can be used in an explosive environment. Such rotary encoder housings differentiate themselves in that two housing halves are connected with screws distributively disposed around the circumference, and the screws and their stud bolts are situated outside of the flame-proof housing.

Such a rotary encoder housing has an undesirably large outer diameter of approximately 100 mm. The large diameter results from the fact that the mounting screws are situated radially outside of the flame-proof, inner housing. For this reason, additional housing planes have to be created radially outside of the flame-proof area as joint planes having ex-joints which are penetrated by the mounting screws holding the housing planes together. With regard to a rotary encoder housing having an axial turning shaft running into the rotary encoder housing in the vertical direction, the known rotary encoder housing provides in the radial (horizontal) direction joining gaps (ex-joints) extending outward which enlarges the outer diameter in an undesirable manner.

Furthermore, other explosion-proof housings for rotary encoders and other sensors having more than two housing parts, which are in the vertical direction above one another and releasably connected to one another via joining gaps, are known, which are sealingly connected by mounting screws radially outward of the pressure-proof area. Such coupling areas extending radially outward between the releasably connected housing parts increase the overall diameter of the sensor housing in an undesirable manner.

SUMMARY

For this reason, it is the object of the present invention to further develop an explosion-proof housing for a rotary encoder of a cylindrical architecture of the art mentioned at the outset in such a manner that, in reference to a particular, specified interior diameter of the pressure-capsulated interior, a substantially smaller outer diameter of the housing is achieved.

This object is achieved an explosion-proof housing for a sensor, in particular, for a rotary encoder having a shaft rotatably situated in the rotary encoder and axially aligned to detect a rotary angle, having a flameproof interior vis-a-vis the atmosphere, in which at least one sensor part is situated, wherein an at least two-part, approximately cylindrical, edged or cone-shaped overall housing is made up of a cover, which is releasably coupled to a possibly multi-part housing by a plurality of fastening screws distributed around the circumference, wherein at least a portion of the contacting fastening planes of the cover and the housing is designed as explosion-proof ex-joints, wherein at least the fastening screws between the cover and the possibly multi-piece housing create the separation between the flame-proof interior and the atmosphere by forming ex-joints.

As an exemplary embodiment of the present invention, it is referred to that, in reference to a circuit board situated in the interior of the pressure-sealed housing having a diameter of, for example, 40 to 50 mm, the outer dimensions of the housing have to be extended by only 5 to 10 mm.

A substantial feature of the present invention is that the rotary encoder is designed in at least two parts and is made up of at least one housing and a cover attached to the housing via axially aligned joining gaps designed as ex-joints, which are connected to the housing by way of axial fastening screws each forming a cylindrical ex-joint (a cylindrical fireproof joint).

The features of the present invention advantageously results in that, instead of locating the coupling area (enlarging the diameter in an undesirable manner) radially outside of the explosion-proof area (pressure area), the cover attachment between the cover and the housing is now integrated into the pressure area. The joining gaps between the interlocking housing parts in their longitudinal extent are axially aligned and are no longer horizontal.

The axial fastening screws disposed in this area, each form an ex-joint with the assigned fastening plane of the housing and the cover. For this reason, it is no longer necessary to provide outside of the flame-proof area an additional fastening area which enlarges the diameter. This fastening area is now situated in the interior of the pressure area and is formed by way of axially aligned joining gaps designed as ex-joints and axial fastening holes for the fastening screws also forming the ex-joints.

This a completely new approach to designing an at least two-part explosion-proof housing for a sensor of a general type because it is no longer necessary to provide radially outward of the flame-proof or pressure-proof area an additional fastening area having ex-joints or outside of the ex-joints.

A first embodiment of the present invention provides that the explosion-proof housing is made up of two approximately cylindrical parts, that is, a cover, which serves as a cable inlet and via which at least one cable is inserted into the interior of the housing, and the housing itself.

According to the present invention, this cover may be connected to a housing having one or a plurality of parts. In the subsequent description and in the patent claims, the term housing is used either for a one-piece housing or for a multi-part housing. In the case of a two-part or multi-part housing, the housing is made up of at least the housing itself and a cylindrical cap connected to the housing.

In the case that the housing is designed as one piece, the housing is made up of a connection between a cap fitted onto the housing and the housing itself, and the cap and the housing preferably form one piece, which is, for example, sealed via a screw connection or an adhesive bond.

Another embodiment of the present invention provides that the cover is connected to a two-part housing. Both housing parts, for example, a cap and the housing itself, are connected to each other by further screws. It is not necessary that these screws form an explosion-proof joining gap (ex-joint) to connect the two housing parts because these screws are situated in the pressure area and a pressure surge in this area acts upon the sealed coupling area between the housing and the cap. Such a butt joint is preferably designed as a tight and pressure-resistant cylindrical threaded bolt connection.

In the event that the cap and the housing are formed as separate parts and are detachable from each other, it may be thus provided that, next to and radially outside of the bolted connection, explosion-proof joining gaps are additionally provided which are designed either as cylindrical gaps which are subjected to tight tolerance and are self-sealing or—in another embodiment—the gaps are designed as threaded bolt connections.

The threaded joint then serves the purpose of enabling the ignition spark which may result in the interior of the housing also extinguishing in the threaded joint.

At the core of the present invention is the fact that, according to the present invention, the coupling areas formed by the fastening screws and then explosion-proofed are relocated into the interior of the overall housing of the sensor. For this purpose, a special fastening screw is respectively used for forming an ex-joint within the fastening hole. The fastening screw is to be understood as a cylindrical screw which has a screw head of any design. The screw head may have an external hexagon head, an internal hexagon head or another actuation surface.

A cylindrical shaft having a diameter with narrow tolerances, which has an axial length that is not to fall below a minimum, joins below the head of the fastening screw. The shaft having a specified axial length and diameter is fitted into an assigned through-hole into the cover, as a result of which an annular ex-joint with narrow tolerances forms between the outer diameter of the cylinder shaft of the fastening screw and the interior diameter of the fastening hole, which in its length and its diameter tolerance is designed so that an ignited explosion mixture striking into the ex-joint certainly extinguishes.

For an M-6 screw of typical dimensions, the length of the cylindrical shaft is approximately 6 to 8 mm and the ex-joint forming at the interior circumference of the through hole has a maximum width of $\frac{1}{10}$.

A threaded bolt having a smaller diameter, which engages into the associated threaded hole in the opposite part in which it is screwed, adjoins at the cylindrical bolt, which directly adjoins the head of the fastening screw.

The ex-joint forming the coupling plane between the cover and the cap is tolerated in such a manner that it features a specific small width at a certain minimum length to ensure that, if an explosion takes place in the interior of the housing, the explosive mixture does not detonate to the outside through this gap.

There are three different embodiments for the coupling of the cover and the cap. In a first embodiment, the fastening plane characterized by said explosion coupling joint is formed in the radial direction in a straight and non-angular (planar) manner. This fastening plane extends horizontally, thus, perpendicular to the longitudinal axis of the shaft (running vertically into the housing).

A second embodiment of the present invention provides that the coupling plane is made up of a horizontal ex-coupling joint which transitions into a cylindrical further ex-coupling joint extending in the axial direction. For this arrangement, the coupling joint is thus formed as a combination of one radial and one axial coupling joint while, in the first-mentioned case, the coupling joint is merely oriented in the radial direction.

A third embodiment of the present invention provides a design of the explosion coupling joint exclusively as a cylindrical gap extending in the axial direction. Adjoining joining gaps which are possibly technically suitable from a design point of view have, in this instance, no explosion protection function.

Sealed Screw Head:

A further inventive idea of the present invention, which is to be protected independently from the remaining features of the present invention but also in combination with these features, provides that a circular peripheral seal (sealing ring) is disposed at the screw head of the fastening screw, which sealingly fits by its outer circumference into an assigned exemption in the cover or in another outwardly oriented housing plane to so ensure an exemption in the cover sealed by the screw head or in another outwardly oriented housing plane.

The sealing ring is thus situated in an annular groove at the screw head and, undergoing elastomer deformation, fits by its outer circumference in a sealing manner at the inner circumference of the exemption in the cover or at another outwardly open and outwardly oriented housing plane. If foreign substances, for example, water, liquids, dust and the like, penetrate from above the sealed ring joint formed in this manner, an expansion of these substances past the sealing ring in the direction of the bottom of the exemption is prevented.

Captive Fastening of the Fastening Screw:

A further inventive idea of the present invention, which is to be protected independently from the remaining features of the present invention but also in combination with these features, provides a captive fastening of the explosion fastening screw.

This exemplary embodiment provides that a recess opened towards the top is located in the coupling area to the other housing part, into which a locking ring is inserted movably fitting onto a specified part of the bolt of the fastening screw and which is secured in position at another part of the fastening screw, which has an enlarged diameter, when the fastening screw is pulled out.

In this manner, the fastening screw may be pulled out from the fastening hole only in a certain drawing or releasing manner. It may not be pulled out completely. Thus, it is securely mounted in the fastening hole.

Such a captive fitting is advantageous for the previously mentioned explosion fastening screws because it means that one explosion fastening screw may not simply be exchanged for another screw which is not forming an ex-joint.

Moreover, the captive fastening ensures that such explosion fastening screws are actually installed and not accidentally omitted when installing a multi-part housing.

The subject of the present invention not only results from the provisions of the individual patent claims but also from a combination of the individual patent claims with one another.

All specifications and features disclosed in the documents including the abstract, in particular, the spacial embodiments illustrated in the drawings, are claimed as substantial to the present invention as far as they are novel, individually or in combination, vis-a-vis the related art.

BRIEF DESCRIPTION OF THE DRAWINGS

In the following, the present invention is described in further detail on the basis of drawings showing only one embodiment. In this instance, further features and advantages of the present invention substantial to the present invention result from the drawings.

FIG. 5 shows a schematically illustrated section of an explosion fastening screw in the installed condition in a first embodiment.

FIG. 6 shows a modified embodiment vis-a-vis FIG. 5.

FIG. 7 shows a schematic illustration in a section of how a screw head may be sealed in reference to a recess in a cover.

FIG. 8 shows a movable captive fastener at an explosion fastening screw in the resting position.

FIG. 9 shows the same illustration as FIG. 8, the captive fastener in the operating position.

DETAILED DESCRIPTION

Figure 1:
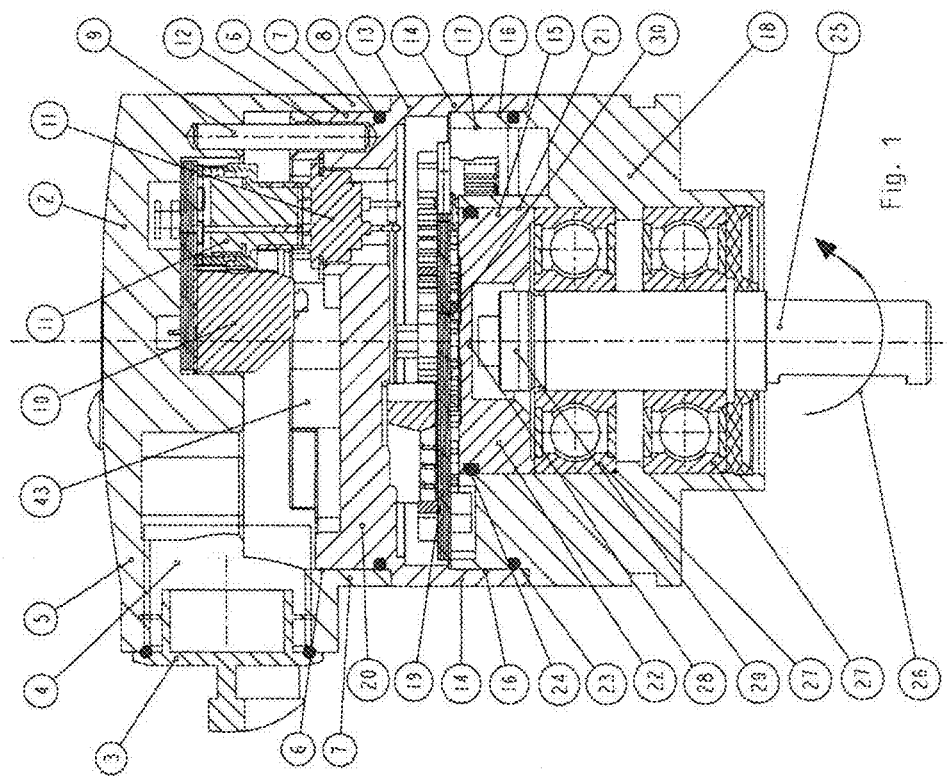
FIG. 1 shows a section through an explosion-proof housing for a sensor.

Given that FIGS. 1 through 4 show the same parts of an explosion-proof housing for a sensor designed as a rotary encoder, the same reference characters are used for the same parts.

Overall housing 1 shown in FIGS. 1 through 4 has a flame-proof interior 43 extending over all three housing parts, that is, a cover 2, a cap 13 and a housing 18. Thus, the overall housing 1 is tripartite and is made up of cover 2, cap 13 connected to cover 2 and housing 18 connected to cap 13.

When an explosion takes place in interior 43, the explosion-proof coupling of the three housing parts 2, 13, 18 according to the present invention with assigned fastening screws 32 is to ensure that a flash-over to the outside (into the environment) does not occur.

Figure 2:
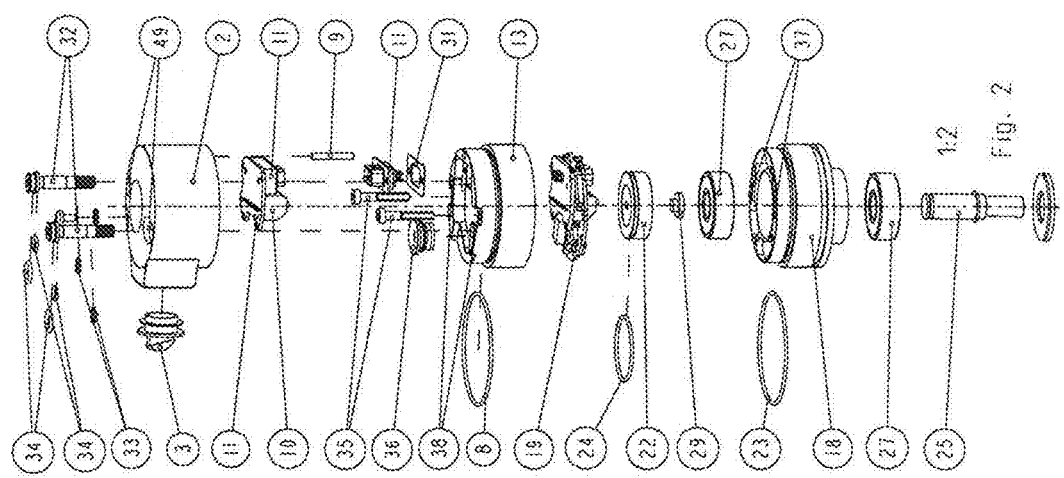
FIG. 2 shows an exploded view of the housing according to FIG. 1 by illustrating further details.

For this purpose, cover 2, according to FIGS. 1 and 2, is made up of a sleeve-shaped part having a lateral cable inlet 4 which is, in the shown exemplary embodiment, is temporarily closed off by a blank part 3. Blank part 3 is releasably inserted into cable inlet 4 and is used to protect overall housing 1 during transport. In individual cases, a (non-illustrated) assigned sealing plug is screwed into thread 5 of cable inlet 4, which inserts the atmosphere through the inserted cable sealed from the atmosphere, into interior 43 of overall housing 1.

It is important that, in order to form a first joining gap, cover 2 has a surrounding ring flange 7 oriented in the axial direction which forms, in conjunction with an inner ring flange 12 of cap 13 lying below, a cylindrical ex-joint (cylindrical flameproof joint) 6 at its inner circumference.

The end face area of ring flange 7 of cover 2 is sealed by an O-ring 8 with respect to the assigned surrounding flange of cap 13.

A terminal block 10, which creates via a plug-in connector 11 the plug-in connection to a sensor part 19 disposed in the interior, is situated in the interior of cover 2. The bottom area of cover 2 is formed by a covering part 20, which is only penetrated by plug-in connector 11, which, according to FIG. 2, is sealed by a flat seal 31. For this reason, the interior of cover 2 is hermetically separated from the interior of cap 13 and housing 18.

In order to better mount cover 2 onto cap 13, a centering pin 9 is provided ensuring to assign the correct positioning between the two parts during installation.

Sensor part 19 is situated in the interior of cap 13, which is made up of an electric circuit board including electrical components and sensors having a diameter of, for example, 40 to 50 mm.

In order to form a second joining gap, cap 13 forms a lower, axial and downwardly oriented ring flange 14 which is sealingly connected with an assigned, opposite oriented ring flange 17 of a housing 18 and forms a further cylindrical ex-joint (cylindrical flameproof joint) 16 (joining gap).

The end face at ring flange 14 is, in reference to the assigned opposite lying part of housing 18, sealed by an O-ring 23.

Rotatable shaft 25 engages into housing 18, which may be rotated, for example, in the direction of arrow 26 and which carries at its upper end face a permanent magnet 29 rotating with shaft 25. Permanent magnet 29 is fitted into an expansion space 28 at the bottom side of a cylinder sleeve 22, and cylinder sleeve 22 forms with its outer circumference having a ring flange 21 a cylindrical ex-joint 15 (joining gap).

Cylinder sleeve 22 is, at the inner circumference of cylindrical housing 18, sealed by way of an O-ring 24.

It should be noted that referenced O-rings 8, 23, 24 may also be omitted because the adjoining housing planes having the joining gaps formed in between them provide the required explosion-relevant sealing on their own.

Shaft 25 is rotatably mounted in the area of two ball bearings 27 which are fitted into housing 18 at the inner circumference of the housing holes.

When rotating the shaft, permanent magnet 29 generates a rotative magnet field through the thinly designed bottom part 30 of cylinder sleeve 22 in the direction of sensor part 19 situated in interior 43 of housing 18. The rotating magnet field transmits the position information of the shaft in a contactless manner to sensor part 19 situated in the interior of housing 18.

According to FIGS. 2, 4, and 5 through 6, special fastening screws 32 are used to connect cover 2 and cap 13 when forming an ex-joint 40. This means that the outer circumference of a portion of fastening screws 32 forms ex-joints 40 in the direction of the inner circumference of the fastening holes and it is thus no longer necessary to provide radially outwards oriented housing or cover expansions which enlarge the diameter of the overall housing, as is required in the related art.

Fastening screws 32 running parallel to shaft 25 in the axial direction form with the corresponding planes of the through-holes 39 ex-joint 40 in cover 2. Thus, these run inside and not outside of ex-joint 6 in the axial direction and not in the radial direction, as is the case in the related art. For this reason, the diameter of overall housing 1 may be minimized.

This results from the exploded view according to FIG. 2, and fastening screws 32 reach through exemption 49 in the area of cover 2 and penetrate the cover in the area of through-holes 39 (see FIGS. 5 and 6). The diameter and the length of through-holes 39 are dimensioned so that the outer diameter of cylindrical shaft 41 of respective fastening screw 32 is narrowly tolerated in relation to the inner diameter of through-hole 39 to so form, in accordance with the directive of DIN EN 60069-1, clause 5.2.4.4, a narrowly tolerated ex-joint 40 according to FIGS. 5 and 6.

According to FIG. 5, the width and length of ex-joint 40 are calculated so that when a flammable mixture is ignited in interior 43 of overall housing 43, it extinguishes on the length of ex-joint 40 and does not expand into the environment of the housing. Cylindrical shafts 41 of fastening screws 32 fitted into through-holes 39 thus form ex-joints 40 and separate flame-proof interior 43 of overall housing 1 from the atmosphere surrounding the sensor.

Thus far, it has not been known to form such an ex-joint 40 directly with fastening screw 32. In this manner, each fastening screw 32 has a dual function; that is, on the one hand, to releasably attach cover 2 and cap 13 in a reliable manner and, on the other hand, to form ex-joints 40, which, in this embodiment, are no longer displaced, radially outwards, to coupling areas between cover 2 and cap 13. Rather, they are integrated in the axial direction into cover 2 itself.

Figure 4:
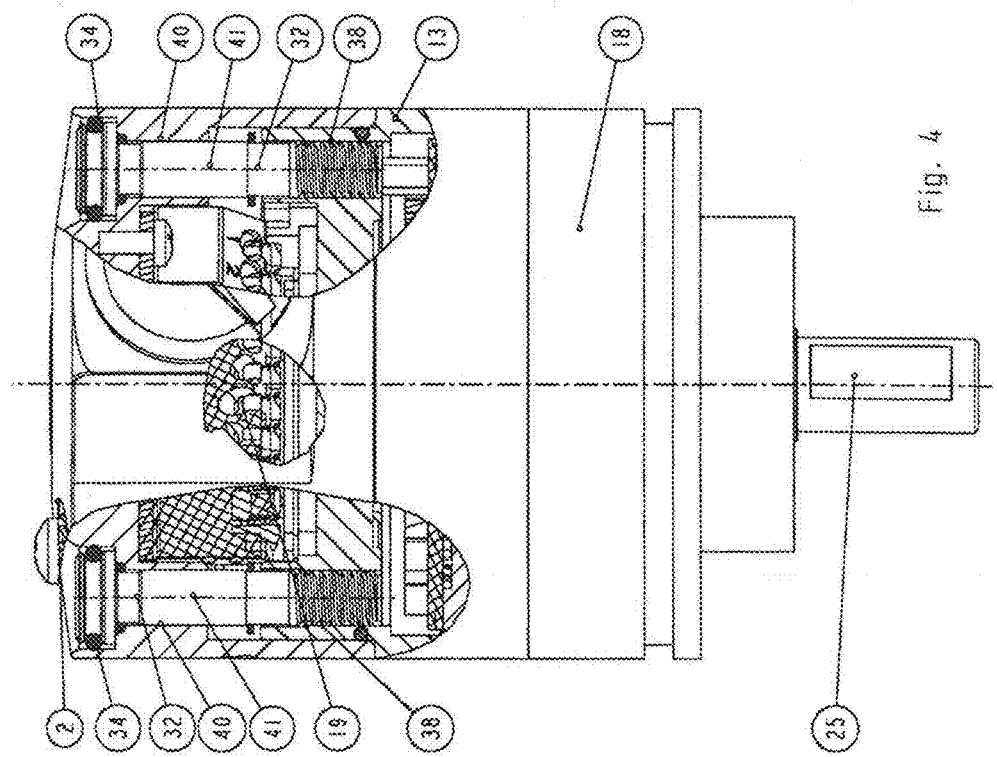
FIG. 4 shows a section through the housing according to FIGS. 1 and 3 at the level of the explosion fastening screws on the cover side.
Figure 3:
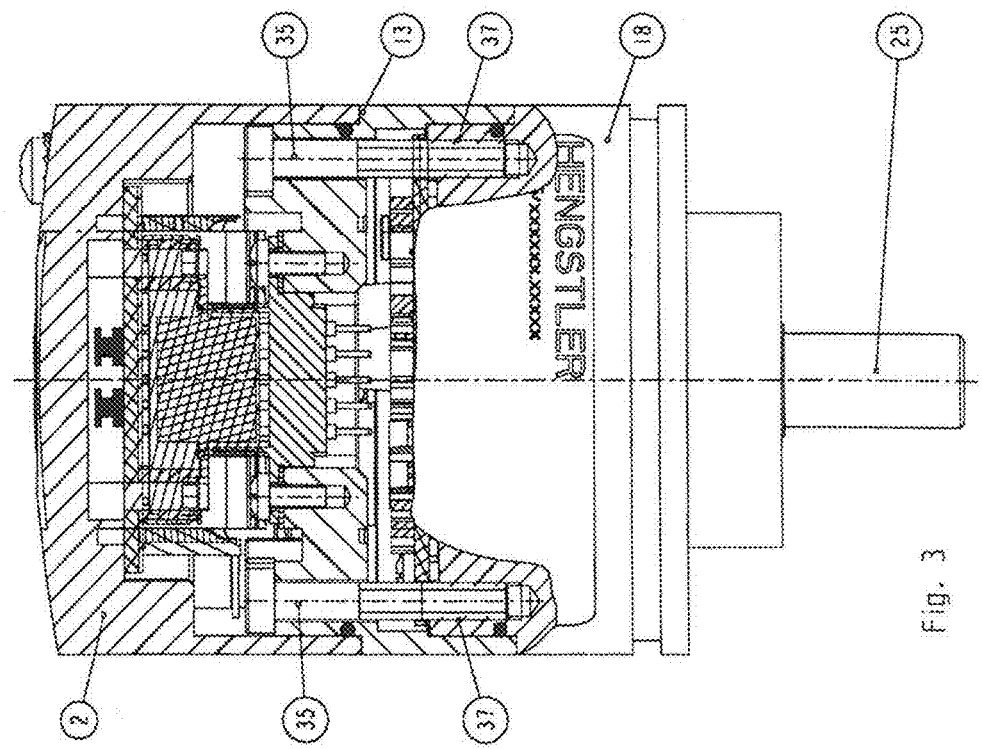
FIG. 3 shows a section through the housing according to FIG. 1 in another sectional position at the level of the fastening screws on the cap side.

The details result from FIGS. 3 and 4 in conjunction with FIGS. 5 and 6.

FIGS. 2 and 3 illustrate that, in order to couple cap 13 and housing 18, fastening screws 35 are used which specifically do not have to be designed in an explosion-proof manner because the ex-joints, according to the illustration in FIG. 1, are formed by ex-joints 6 and 16 and, if applicable, 15 as well.

Hence, fastening screws 35 may be simple, commerically available cylinder head screws.

According to FIG. 2, a plug 36 is situated in the area of cap 13; the removal of which enables to carry out adjustment work on the below-lying circuit board having sensor part 19.

Sealed Fastening Screws:

Preferably, explosion fastening screws 32 have a screw head forming a ring joint in which a sealing ring 34 is situated. According to FIG. 7, sealing ring 34 sealingly attaches to the interior circumference of an assigned exemption 49 in the cover to prevent, in accordance with FIG. 7, so that when foreign substances, in the form of dust, gas or liquids, penetrate exemption 49 in the direction of arrow 50, these substances do not enter ring joint 51 below sealing ring 34. In doing so, the part of exemption 49 below the screw head is protected from corrosion and rotting.

FIG. 7 shows the screw seal of the screw head of explosion fastening screw 32, as it is also illustrated in FIG. 2.

In FIG. 3 it is added that the commercially available fastening screws 35 (cylinder head screws) are screwed into thread holes 37 in housing 18.

In contrast, explosion fastening screws 32 according to the present invention are screwed into threaded holes 38 in cap 13.

This special screw connection is described based on FIGS. 5 and 6.

A cylindrical part having a shaft 41, which in respect to the inner circumference of through-hole 39 forms a narrowly tolerated ex-joint 40 in cover 2, which is not to exceed a certain specified width, attaches at the bottom side of the screw head of fastening screw 32.

Ex-joint 40 continuous perpendicularly in an explosion coupling joint 47 which forms the coupling plane between cover 2 and the top side of cap 13. This explosion coupling joint 47 also has a narrowly tolerated width and a certain length to here also extinguish an invasive ignited mixture.

An example is that the length of ex-joint 40 has to form, in the axial direction at shaft 41 of fastening screw 32, a certain minimum joint length 42.

Threaded bolt 46 having a reduced diameter, which is coupled via a threaded runout 45 to cylindrical shaft 41 having a larger diameter in a manner known per se, adjoins at cylindrical shaft 41 of fastening screw 32 via a ledge 34. Threaded bolt 46 grips into threaded hole 38 in cap 13.

As a modified exemplary embodiment, FIG. 6 shows an outer, radial explosion coupling joint 47 at which joins an axial explosion coupling joint 48. Both coupling joints 47, 48 are thus angled to each other and form the explosion-proof ex-joint.

In a third embodiment, an explosion coupling joint 47 extending in the radial direction may also be completely omitted and only an axial coupling joint 48 may be provided.

If coupling joint 48 has sufficiently large measurements, a radial joint 47 may adjoin which, however, remains without explosion function.

Captive Fastening:

FIGS. 8 and 9 show a movable captive fastener of explosion fastening screws 32. In this instance, it is substantial that below the simply shortened cylindrical shaft 41 a further cylinder shaft 53, having a reduced diameter compared to the diameter of shaft 41, adjoins so that, in this manner, a displacement plane is formed for a locking ring 33 mounted in the area of the cap in a recess 52.

When pulling out fastening screw 32, the locking ring glides along cylinder shaft 53 and attaches at a ledge at the bottom side of the hole in cover 2. This ledge is formed in that threaded bolt 46 is closed in the axially upwards direction by a ring ledge 54, the diameter of which is larger than the inner diameter of locking ring 33 which, for this reason, is carried along when pulling out fastening screw 32 upwards in accordance with FIG. 5. In doing so, fastening screw 32 is captively mounted in threaded hole 38.

While these exemplary embodiments relate to the ex-joints forming fastening screws 32, they are not limited to them. In another embodiment, this type of captive fastener may be used for any other type of releasable and losable fastening screws mounted at a housing.

The dependent claims take into account that overall housing 1 may be formed by two or multiple parts. In the case of the tripartite design of overall housing 1, fastening screws 32 according to the present invention sealingly attach a cover 2 onto the two-part body, which is made up of a cap 13 and thereto attached housing 18.

In the case of a two-part design of overall housing 1, cap 13 may form, together with the thereto connecting housing 18, a one-piece body. Likewise, it is possible that cap 13 and the thereto connecting housing 18 are sealingly coupled to each other via a threaded bolt connection.

LIST OF REFERENCE CHARACTERS

1 Overall housing
2 Cover
3 Blank part
4 Cable inlet
5 Thread
6 Cylindrical ex-joint
7 Ring flange (of 2)
8 O-ring
9 Centering pin
10 Terminal block
11 Plug-in connector
12 Ring flange (of 13)

13 Cap
14 Ring flange (of 13)
15 Cylindrical ex-joint (of 18)
16 Cylindrical ex-joint
17 Ring flange (of 18)
18 Housing
19 Sensor part
20 Covering part (of 13)
21 Ring flange (of 18)
22 Cylinder sleeve
23 O-ring
24 O-ring
25 Shaft
26 Direction of arrow
27 Ball bearing
27 Expansion space
28 Permanent magnet
30 Bottom part (of 22)
31 Flat seal
32 Fastening screw with ex-joint
33 Locking ring
34 Sealing ring
35 Fastening screw
36 Plug
37 Threaded hole (for 35)
38 Threaded hole (for 32)
39 Through-hole (of 2)
40 Ex-joint
41 Shaft (of 32); cylindrical
42 Joint length
43 Interior
44 Ledge
45 Thread runout
46 Threaded bolt
47 Explosion coupling joint (planar)
48 Explosion coupling joint (cylindrical)
49 Exemption
50 Direction of arrow
51 Ring joint
52 Recess
53 Cylinder shaft
54 Ring ledge

What is claimed is:

1. An explosion-proof housing for a sensor, the sensor having a shaft rotatably situated therein and axially aligned to detect a rotary angle, and a flameproof interior vis-a-vis the atmosphere, in which at least one sensor part is situated, the explosion-proof housing comprising an at least two-part, approximately cylindrical, edged or cone-shaped overall housing component comprising a cover, which is releasably coupled to an internal housing by a plurality of fastening screws distributed around the circumference, wherein at least a portion of the contacting fastening planes of the cover and the internal housing is designed as explosion-proof ex-joints, at least the fastening screws between the cover and the internal housing create the separation between the flameproof interior and the atmosphere by forming ex-joints that outwardly continue in the radial direction as an explosion coupling joint between adjoining housing planes of the cover and the internal housing.

2. The explosion-proof housing according to claim 1, wherein one cylindrical shaft of the fastening screws forms an ex-joint in the direction of the inner circumference of a cylindrical through hole in the internal housing.

3. The explosion-proof housing according to claim 1, wherein the longitudinal extension of the ex joints formed by the fastening screws runs parallel to the longitudinal axis of the shaft and the overall housing.

4. The explosion-proof housing according to claim 1, wherein the explosion coupling joint is formed in a radially-outward straight manner or an angled, radially-outward straight manner and, additionally, in an axially angled manner.

5. The explosion-proof housing according to claim 1, wherein the joining gaps between the cover and the internal housing are cylindrical ex-joints extending in the axial direction.

6. The explosion-proof housing according to claim 1, wherein the sensor comprises a rotary encoder in which the shaft is rotatably situated.

7. The explosion-proof housing according to claim 1, wherein the internal housing comprises two housing elements coupled together by fastening screws.

8. The explosion-proof housing according to claim 1, wherein the internal housing comprises a cap and an end housing, and at the end face of the shaft rotatably included in the internal housing a permanent magnet is situated which, when the shaft is rotated, generates, in the direction of the sensor part located in the interior of the end housing, a rotative magnet field through the bottom part of a cylinder sleeve fitted into the end housing.

9. The explosion-proof housing according to claim 1, wherein the internal housing comprises a cap and an end housing, and an optical, capacitive or inductive material measure is disposed at the end face or at the circumference near the end face of the shaft rotatably included in the housing, which is, when the shaft is rotated, evaluated by a sensor part situated in the interior of the end housing.

10. The explosion-proof housing according to claim 1, wherein the width of the ex joints and their length are minimized so that when a flammable mixture is ignited in the interior of the overall housing, said mixture extinguishes on the length of the ex joints and cannot expand into the environment of the overall housing.

11. An explosion-proof housing for a rotary encoder having a shaft rotatably situated in the rotary encoder and axially aligned to detect a rotary angle, and having a flameproof interior vis-a-vis the atmosphere, in which at least one sensor part is situated, the explosion-proof housing comprising an at least two-part, approximately cylindrical, edged or cone-shaped overall housing component comprising a cover, which is releasably coupled to an internal housing by a plurality of fastening screws distributed around the circumference, wherein at least one portion of the contacting fastening planes of the cover and the internal housing is designed as explosion-proof ex-joints, wherein the plurality of fastening screws are securely mounted at the cover and form ex joints that outwardly continue in the radial direction as an explosion coupling joint between adjoining housing planes of the cover and the internal housing.

12. The explosion-proof housing according to claim 11, wherein the internal housing comprises a cap and an end housing, and at the end face of the shaft rotatably included in the internal housing a permanent magnet is situated which, when the shaft is rotated, generates, in the direction of the sensor part located in the interior of the end housing, a rotative magnet field through the bottom part of a cylinder sleeve fitted into the end housing.

13. The explosion-proof housing according to claim 11, wherein the internal housing comprises a cap and an end housing, and an optical, capacitive or inductive material measure is disposed at the end face or at the circumference near the end face of the shaft rotatably included in the housing, which is, when the shaft is rotated, evaluated by a sensor part situated in the interior of the end housing.

14. The explosion-proof housing according to claim 11, wherein the width of the ex joints and their length are minimized so that when a flammable mixture is ignited in the interior of the overall housing, said mixture extinguishes on the length of the ex joints and cannot expand into the environment of the overall housing.

15. An explosion-proof housing for a rotary encoder having a shaft rotatably situated in the rotary encoder and axially aligned to detect a rotary angle, and having a flameproof interior vis-a-vis the atmosphere, in which at least one sensor part is situated, the explosion-proof housing comprising an at least two-part, approximately cylindrical, edged or cone-shaped overall housing component comprising a cover, which is releasably coupled to an internal housing by a plurality of fastening screws distributed around the circumference, wherein at least one portion of the contacting fastening planes of the cover and the internal housing is designed as explosion-proof ex-joints, wherein the screw heads of the plurality of fastening screws are sealingly situated in the cover and the fastening screws form ex-joints that outwardly continue in the radial direction as an explosion coupling joint between adjoining housing planes of the cover and the internal housing.

16. The explosion-proof housing according to claim 15, wherein the internal housing comprises a cap and an end housing, and at the end face of the shaft rotatably included in the internal housing a permanent magnet is situated which, when the shaft is rotated, generates, in the direction of the sensor part located in the interior of the end housing, a rotative magnet field through the bottom part of a cylinder sleeve fitted into the end housing.

17. The explosion-proof housing according to claim 16, wherein the internal housing comprises a cap and an end housing, and an optical, capacitive or inductive material measure is disposed at the end face or at the circumference near the end face of the shaft rotatably included in the housing, which is, when the shaft is rotated, evaluated by a sensor part situated in the interior of the end housing.

18. The explosion-proof housing according to claim 16, wherein the width of the ex joints and their length are minimized so that when a flammable mixture is ignited in the interior of the overall housing, said mixture extinguishes on the length of the ex joints and cannot expand into the environment of the overall housing.

* * * * *